United States Patent

Tokarz

[15] 3,661,061
[45] May 9, 1972

[54] PICTURE POSITION FINDER

[72] Inventor: Richard D. Tokarz, Richland, Wash.

[73] Assignee: The United States of America as represented by the United States Atomic Energy Commission

[22] Filed: May 5, 1969

[21] Appl. No.: 821,597

[52] U.S. Cl. ............................................. 95/1.1, 33/207 R
[51] Int. Cl. ........................................................ G03b 17/24
[58] Field of Search ................ 95/1.1, 12.5; 350/110; 33/207

[56] References Cited

UNITED STATES PATENTS

| | | | |
|---|---|---|---|
| 1,490,487 | 3/1874 | Schmidt | 95/1.1 |
| 1,618,237 | 2/1927 | Sturm | 33/207 |
| 2,273,876 | 2/1942 | Lutz et al. | 95/1.1 |
| 3,142,235 | 7/1964 | Siegmund | 95/11 |

Primary Examiner—Samuel S. Matthews
Assistant Examiner—Robert P. Greiner
Attorney—Roland A. Anderson

[57] ABSTRACT

A device which shows the up-and-down orientation of a photograph regardless of the camera attitude at the time the picture was taken. A freely rotatable pointer in the camera body is gravity responsive and an image thereof is projected on the film. In another embodiment images are projected on the film of a pair of pointers mounted at right angles to each other to indicate the up-and-down orientation of the photograph whether the camera is rotated in a vertical plane parallel to the film or rotated in a vertical plane normal to the film; a fiber optics system provides means for transmitting images of the pointers to the film where the pointers are mounted exterior to the camera.

2 Claims, 4 Drawing Figures

PATENTED MAY 9 1972 3,661,061
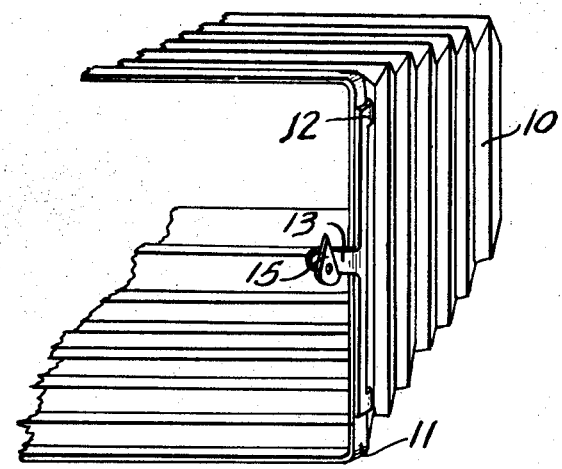
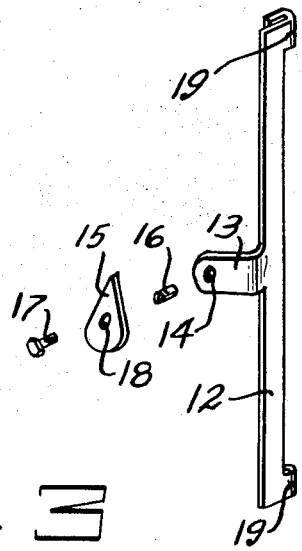
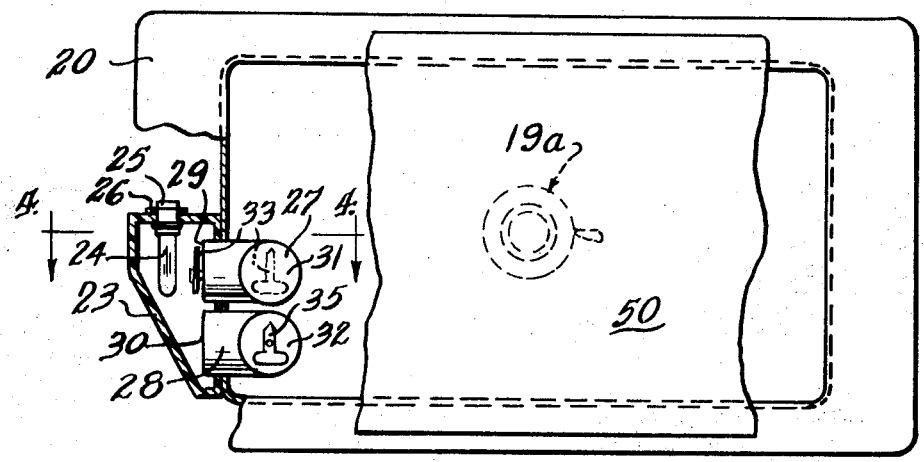
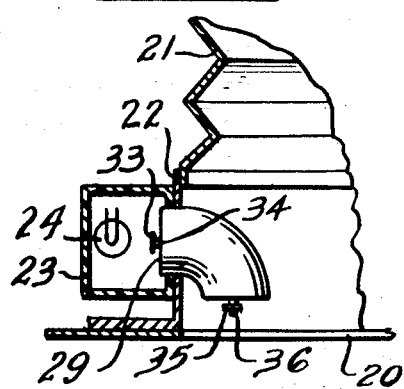
Inventor
Richard D. Tokarz
Attorney

PICTURE POSITION FINDER

CONTRACTUAL ORIGIN OF THE INVENTION

The invention described herein was made in the course of, or under, a contract with the United States Atomic Energy Commission.

BACKGROUND OF THE INVENTION

This invention relates to a device for determining the up-and-down orientation of a photograph and, in particular, relates to means for determining the downward position of a photograph whether, at the time the picture was taken, the camera had been rotated in a vertical plane parallel to the film or whether the camera had been rotated in a vertical plane normal to the film.

Very often in industrial photography, the camera is rotated to various positions in order to obtain a particular photograph. In many instances, the subject matter that is photographed is unfamiliar and provides no particular direction orientation when viewed apart from the general setting. A problem that one meets upon viewing a photograph of isolated equipment is to determine the up-and-down orientation of the photograph. Until now, there has not been available a device for recording on the photograph itself information which shows the up-and-down orientation of the subject matter.

It is the principal object of this invention to provide means for determining the up-and-down orientation of a photograph without obscuring large areas of the photograph.

BRIEF DESCRIPTION OF THE DRAWINGS

The invention may be better understood by reference to the following figures in which:

FIG. 1 is a partial isometric view of one embodiment of this invention attached to a camera bellows.

FIG. 2 is a expanded view of the embodiment shown in FIG. 1.

FIG. 3 is a view from the rear of a camera having the back removed and with parts broken away having another embodiment of this invention attached to the side thereof.

FIG. 4 is a sectional view taken on line 4—4 of FIG. 3.

While the figures show the embodiments of this invention in connection with a bellows-type camera, this invention is applicable to cameras without bellows if sufficient space is available within the camera body to house the invention.

An embodiment of this invention is shown in FIGS. 1 and 2 where a camera is represented by bellows 10 and bellows frame 11. An elongated bar 12 has a transverse tongue 13 which has an aperture 14 therein. Rotatably fixed to tongue 13 is a pointer 15 by means of a spacer 16 and a spindle 17 that passes through an aperture 18 in the pointer and aperture 14 in tongue 13. The elongated bar 12 has two U-shaped gripping members 19 at either end thereof and is mounted on frame 11 as shown in FIG. 1. The film (not shown) forms a plane parallel and adjacent to the plane of frame 11, and the tongue 13 is bent 90° after bar 12 is mounted on the frame so the tongue as well as a surface generated by rotation of pointer 15 is parallel to the film. Pointer 15 is unevenly weighted, by its configuration as shown or by adding a weight at one end thereof. Because pointer 15 is freely rotatable and is unevenly weighted, it is gravity responsive and will orientate itself with its heavy end down.

If a camera containing the device shown in FIGS. 1 and 2 is rotated in a vertical plane parallel to the film, pointer 15 will always assume a position with its weighted end down and its unweighted end pointing up. When a picture is taken, an image of the pointer will be projected on the film and due to image inversion in the photograph the unweighted portion of pointer 15 will point in the downward position. With this device the downward position of the photograph is shown by pointer 15 regardless of the degree of rotation in a vertical plane parallel to the film at the time the picture was taken. The device is also applicable to rotation slightly out of the aforesaid vertical plane by approximately 20 to 30°.

If the camera is not only rotated in the aforementioned vertical plane but is also slightly canted forward or backward, that is rotated in a vertical plane normal to the plane of the film, pointer 15 will continue to operate and show the downward position. If the angle of the camera exceeds more than about 20 to 30° from the vertical plane parallel to the film, then pointer 15 will "hang-up" or bind against spacer 16 or spindle 17 and cease to be a true indicator of the downward position. It is to compensate for those cases in which the camera is not only rotated in a vertical plane parallel to the film but also rotated in a vertical plane normal to the film that a second embodiment is provided as shown in FIGS. 3 and 4.

FIG. 3 shows a camera in which a lens and shutter assembly 19a faces into the plane of the paper. As shown in FIG. 4, a camera frame 20 has a bellows 21 connected to it by means of a bellows bracket 22. A housing 23 attached to bracket 22 contains a bulb 24 fixed in a bulb socket 25 mounted in the housing. Seals 26 prevent light leakage into the housing. A pair of adjacent fiber optic light guides 27 and 28 pass through housing 23 and bracket 22 into the camera body. Ends 29 and 30 of light guides 27 and 28 respectively, located in housing 23, form a plane normal to film 50. Light guides 27 and 28 are bent 90° so that ends 31 and 32 of light guides 27 and 28 respectively, located in the camera body, form a plane proximate and parallel to film 50. An unevenly weighted pointer 33 is rotatably mounted on end 29 of fiber optic light guide 27 by means of spindle 34; rotation of pointer 33 generates a surface normal to film 50. An unevenly weighted pointer 35 is rotatably mounted on end 32 of fiber optic light guide 28 by means of spindle 36; rotation of pointer 35 generates a surface proximate and parallel to film 50.

The bulb 24 in socket 25 is connected by means (not shown) to the lens and shutter assembly 19a and to a battery (not shown) so activation of the shutter produces a flash of the bulb. When bulb 24 flashes, light produced thereby travels through fiber optic light guides 27 and 28 and produces an image of pointers 33 and 35 on film 50, see the dotted image of pointer 33 on end 31 of fiber optic light guide 27. Because pointers 33 and 35 are perpendicular to each other, a downward pointing image is cast on film 50 whether the camera is rotated in a vertical plane parallel to or normal to the film. An additional advantage of using light guides 27 and 28 is that an independent light source is provided for pointers 33 and 35, and direction orientated images are projected onto the photograph regardless of the amount of light admitted through the lens. The device of this invention is operable, therefore, irrespective of proper film exposure and independent of the subject matter where dark areas on the photograph surrounding the pointers might obscure them.

While fiber optic light guides 27 and 28 shown in FIGS. 3 and 4 describe a simple elbow bend so that pointer 33 is in housing 23 while pointer 35 is in the camera body, other configurations may be used so that both pointers are in the housing. A fiber optic light guide having a U-configuration may be used so that the pointer which generates a surface parallel to the film also is in the housing. The actual configuration of the fiber optic light guides is not critical to the invention provided that one pointer generates a surface parallel to the film and another generates a surface normal to the film.

The embodiments of the invention in which an exclusive property or privilege is claimed are defined as follows:

1. In a camera adapted to expose film, having a camera body, a lens and a shutter, the improvement comprising a pair of rotatable unevenly weighted pointers mounted so that rotation thereof generates one surface parallel to the film and one surface normal to the film and further comprising a housing exterior to the camera body; a light source in the housing synchronized to produce light upon activation of the shutter; a pair of adjacent fiber optic light guides one end thereof located in the housing and one end thereof located in the camera body proximate the film; wherein the pointer which generates a surface parallel to the film is mounted on an end of one fiber optic light guide inside the camera body and the pointer which generates a surface normal to the film is mounted on an end of the other fiber optic light guide located in the housing, whereby images of said pointers projected to the film upon activation of the shutter show an up-and-down orientation whether the camera is rotated in a vertical plane parallel to the film or a vertical plane normal to the film.

2. A device for projecting an image on film comprising: a lens housed in a body, shutter means for admitting light through the lens to the film, a pair of rotatable, unevenly weighted pointers, one of which is mounted inside the body between the lens and the film so that a surface generated by rotation thereof is parallel to the film and the other of which is mounted in a housing exterior to the said body so that a surface generated by rotation thereof is normal to the film and means whereby an image of said pointers is projected onto the film comprising a pair of fiber optic light guides extending from the housing into the body and terminating proximate the film, one of said pointers being rotatably mounted on an end of one fiber optic light guide inside the body and the other pointer being mounted on an end of the other fiber optic light guide in the housing; and a light source in the housing coordinated to produce light upon activation of the shutter means, whereby light from said source travels through said fiber optic light guides and produces images of said pointers on the film.

* * * * *